United States Patent
Albornoz et al.

(10) Patent No.: US 7,660,846 B2
(45) Date of Patent: Feb. 9, 2010

(54) METHOD FOR DYNAMICALLY TARGETED INSTANT MESSAGING

(75) Inventors: Jordi Albornoz, Arlington, MA (US); Lee D. Feigenbaum, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 10/724,969

(22) Filed: Dec. 1, 2003

(65) Prior Publication Data

US 2005/0120077 A1 Jun. 2, 2005

(51) Int. Cl.
G06F 15/16 (2006.01)
G06F 15/173 (2006.01)

(52) U.S. Cl. .................. 709/203; 709/206; 709/207; 709/224

(58) Field of Classification Search .................. None
See application file for complete search history.

(56) References Cited

U.S. PATENT DOCUMENTS

| | | | |
|---|---|---|---|
| 6,145,079 A * | 11/2000 | Mitty et al. | 713/170 |
| 6,161,181 A * | 12/2000 | Haynes et al. | 713/170 |
| 6,199,052 B1 * | 3/2001 | Mitty et al. | 705/75 |
| 6,282,709 B1 * | 8/2001 | Reha et al. | 717/175 |
| 6,430,604 B1 * | 8/2002 | Ogle et al. | 709/207 |
| 6,751,453 B2 * | 6/2004 | Schemers et al. | 455/412.1 |
| 7,117,239 B1 * | 10/2006 | Hansen | 709/200 |
| 7,283,805 B2 * | 10/2007 | Agrawal | 455/412.2 |
| 2001/0003202 A1 | 6/2001 | Mache et al. | 713/153 |
| 2001/0003203 A1 | 6/2001 | Mache | 713/201 |
| 2001/0037453 A1 * | 11/2001 | Mitty et al. | 713/168 |
| 2002/0065828 A1 | 5/2002 | Goodspeed | 707/100 |
| 2002/0077801 A1 | 6/2002 | Morehead et al. | 703/24 |
| 2002/0120717 A1 * | 8/2002 | Giotta | 709/219 |
| 2002/0138551 A1 * | 9/2002 | Erickson | 709/203 |
| 2002/0143916 A1 | 10/2002 | Mendiola et al. | 709/223 |
| 2002/0173308 A1 | 11/2002 | Dorenbosch et al. | 455/435 |
| 2002/0184089 A1 | 12/2002 | Tsou et al. | 705/14 |
| 2004/0019645 A1 * | 1/2004 | Goodman et al. | 709/206 |

OTHER PUBLICATIONS

Why Distance Matters: Effects on Cooperation, Persuasion and Deception. By Erin Bradner and Gloria Mark, Dept. of Information and Computer Science, University of California, Irvine, Irvine, CA 92697-3425. pp. 226-235.

(Continued)

*Primary Examiner*—John B. Walsh
(74) *Attorney, Agent, or Firm*—Cantor Colburn LLP; John Campbell

(57) ABSTRACT

A network communication system for instant messaging comprising: a client-server network system with a server in communication with a client and a server and a network for communication therebetween, each of the server and the client operating as at least one of a sender and a recipient of a combined message; wherein the combined message includes a code and a communications message; and wherein the sender transmits at least one of the code and the combined message to the recipient. A method for instant messaging in a network communication system comprising: formulating a combined message to a recipient, the combined message including a code and a communications message; and transmitting at least one of the code and the combined message to a recipient.

7 Claims, 2 Drawing Sheets

OTHER PUBLICATIONS

Managing Content in Collaborative. By Neena Buck. Software Magazine. pp. 26-30.

The Next Bang: The Explosive Combination of Embedded Linux, XML and Instant Messaging. By Doc Searls, Senor Editor of Linux Journal. pp 1-10.

A Micro-Economic Approach to Conflict Resolution in Mobile Computing by Licia Capra, Wolfgang Emmerich and Cecilia Mascolo. Dept. of Computer Science, University College London, Gower St., London WC1E 6BT, UK. pp. 31-40.

* cited by examiner

METHOD FOR DYNAMICALLY TARGETED INSTANT MESSAGING

BACKGROUND OF THE INVENTION

The present invention relates generally to instant messaging systems and methodologies.

Instant messaging has continually risen in importance as a business productivity solution. New capabilities and functionality have been continuously added on top of the existing one-on-one message exchange and presence information that form the basis of instant messaging. These capabilities include group chat, audio and video messages, collaborative tools, and file transfer.

Although significant work has gone into extending the functionality of instant-messaging systems, the level of granularity available for utilizing these systems is still surprisingly large. Instant-messaging software typically provides the ability to communicate with one other person, with a small group of people explicitly chosen by the user, and sometimes with a predefined large group of people. There is no way to automatically target a message (or chat invitation or audio clip or file transfer) to people meeting a certain criteria. Therefore, what is needed in the art is way to automatically target a message to an individual or audience satisfying selected criteria.

BRIEF SUMMARY

The above-discussed and other drawbacks and deficiencies of the prior art are overcome or alleviated by the communication system and methodology disclosed herein. Disclosed herein in an exemplary embodiment is a method for instant messaging in a network communication system comprising: formulating a combined message to a recipient, the combined message including a code and a communications message; and transmitting at least one of the code and the combined message to a recipient. The method further includes in another exemplary embodiment: executing the code to establish at least one of: modifying a persistent state associated with the recipient based on the code to indicate whether a selected communications message should be delivered and delivering the communications message; and establishing the code as a predicate for evaluating whether a selected communications messages should be delivered; returning a function value indicative thereof; and transmitting the communications message if the function value indicates the communications message should be delivered.

Also disclosed herein in another exemplary embodiment is a network communication system for instant messaging comprising: a client-server network system with a server in communication with a client and a server and a network for communication there between, each of the server and the client operating as at least one of a sender and a recipient of a combined message; wherein the combined message includes a code and a communications message; and wherein the sender transmits at least one of the code and the combined message to the recipient.

Further disclosed herein in yet another exemplary embodiment is the network communication system above further including: executing the code to establish at least one of: modifying a persistent state associated with the recipient based on the code to indicate whether a selected communications message should be delivered and delivering the communications message; and establishing the code as a predicate for evaluating whether a selected communications messages should be delivered; returning a function value indicative thereof; and transmitting the communications message if the function value indicates the communications message should be delivered.

Disclosed herein in yet another exemplary embodiment is a storage medium encoded with a machine-readable computer program code, said code including instructions for causing a computer to implement the abovementioned method for instant messaging in a network communication system.

Further disclosed herein in yet another exemplary embodiment is a computer data signal, said data signal comprising code configured to cause a controller to implement the abovementioned method for instant messaging in a network communication system.

BRIEF DESCRIPTION OF THE DRAWINGS

These and other objects and advantages of the present invention may be best understood by reading the accompanying detailed description of the exemplary embodiments while referring to the accompanying figures wherein like elements are numbered alike in the several figures in which.

The detailed description explains the preferred embodiments of our invention, together with advantages and features, by way of example with reference to the drawings.

DETAILED DESCRIPTION OF THE EXEMPLARY EMBODIMENTS

As stated earlier, the level of granularity available for utilizing instant messaging systems remains relatively large. Instant-messaging software typically provides the ability to communicate with one other person, with a small group of people explicitly chosen by the user, and sometimes with a predefined large group of people. Disclosed herein in an exemplary embodiment is a methodology and system to facilitate automatically targeting a message to an individual or audience satisfying selected criteria.

Figure 1:
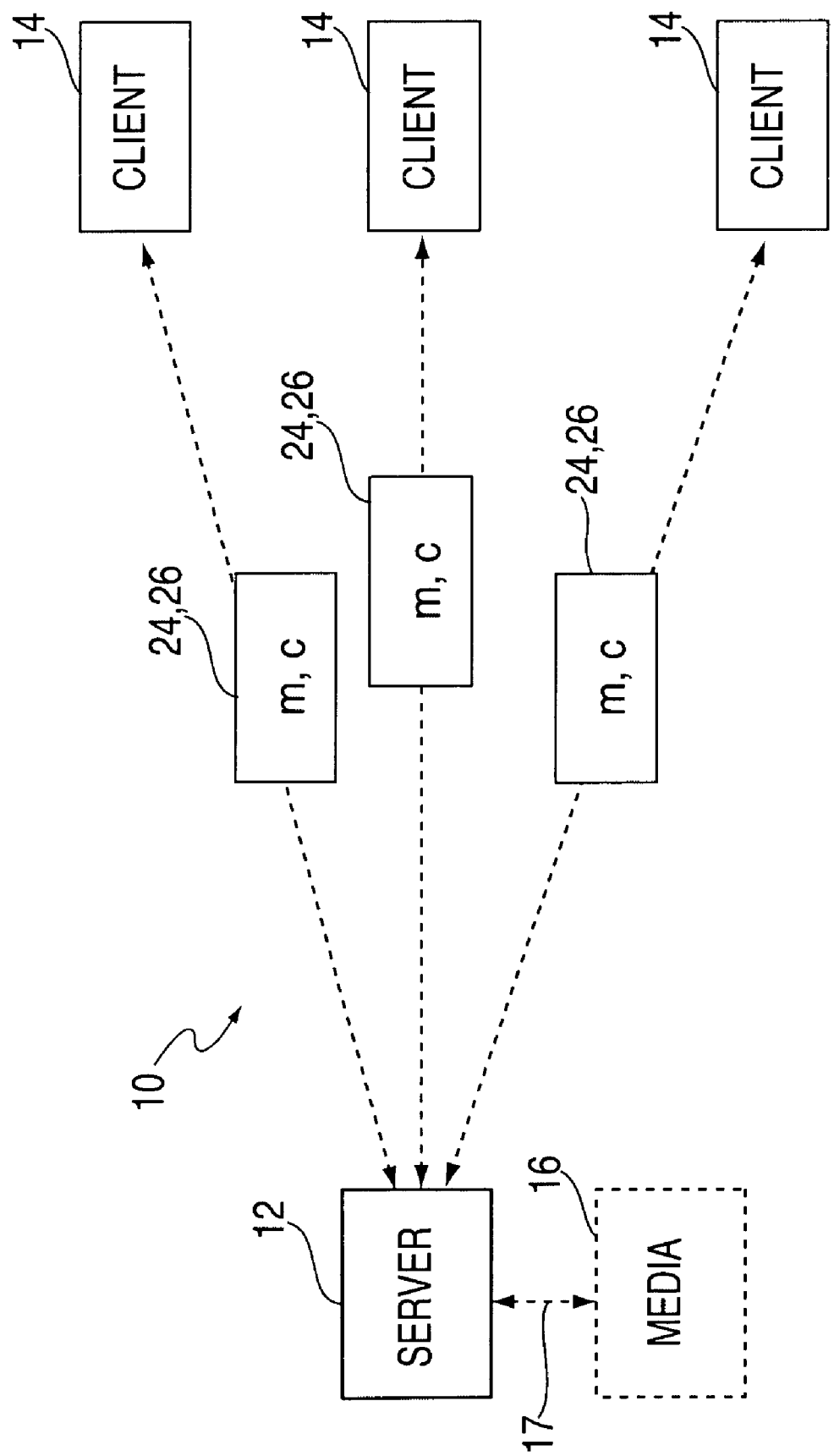
FIG. 1 is a diagrammatic view depicting a client server network communication system in accordance with an exemplary embodiment.

Referring now to FIG. 1, an instant messaging network system 10 in accordance with an exemplary embodiment is depicted. The instant messaging network system includes, but is not limited to, a server system 12 and various clients 14 interconnected via various communications means e.g., network to facilitate client 14—server 12 and client 14—client 14 information transfer. The instant messaging system may be employed for various communications, including but not limited to instant messaging, email, data, voice, and image transmittal, internet services, and the like, as well as combinations including at least one of the foregoing. Each client system 14 may be a general-purpose desktop computer that subscribes to a network communication system e.g., Internet service provider, email system and the like and includes operating system software and any other suitable programs that reside in memory and execute on client system 14. It will be understood by those skilled in the art that the instant messaging network system 10 may be executed on computer systems with variant architectures. Client system 14 is in communication with host system that may also be a server system 12 via a network connection such as the Internet, Intranet, LAN, WAN, or other suitable means of networking architecture.

Servers systems 12 refer to sources that provide content to computer clients such as client system 14. For example, server 12 may be operated by a business enterprise that maintains a web site for its customers. Another server 12 may be an enterprise server or a third party host server that manages large volumes of data on behalf of businesses, individuals, or organizations that outsource the management of their content to the third party host server. While only one is shown, it will be understood that any number of servers 12 and clients 14 may be used in order to realize the advantages of the described embodiments.

In one embodiment, a server executes an instant messaging system 10 and allows client system 14 to access its features and functions as described further herein. In an alternate embodiment, client system 14 shares execution of the instant messaging system 10 with server 12.

Figure 2:
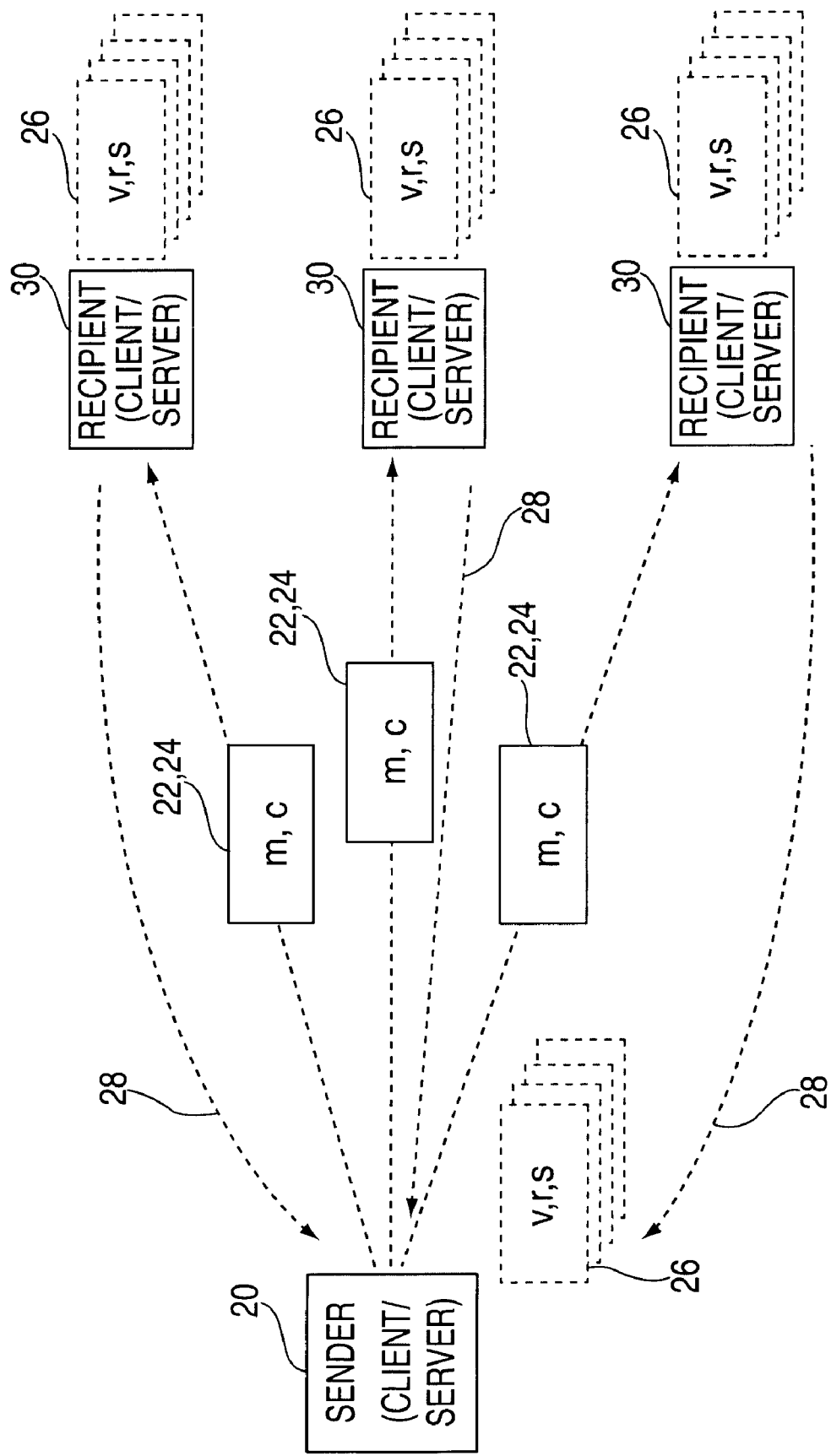
FIG. 2 is a partial diagrammatic depiction of message communication among a sender and several recipients in accordance with an exemplary embodiment.

Referring now to FIG. 2 as well, in an exemplary embodiment the abovementioned granularity issue is addressed using client-based predicates (and other codes) and variables within an instant-messaging system 10. Client-based predicates and variables offer the advantage of allowing the sender 20 of a message 24 to address only those recipients 30 that satisfy or best satisfy selected criteria. Advantageously, this approach avoids forcing a message sender 20 to either target a superset of potential audience recipients or to manually build a recipient 30 list. More generally, an exemplary embodiment as disclosed herein allows a message originator or sender 20 to send an arbitrary code 22 also denoted as c or variable 23 also denoted as v along with an instant message 24 also denoted as m. The code 22 or variable 26 may be used to modify persistent state within the recipient's 30 instant-messaging software or as a predicate to determine whether the message should be displayed to the recipient or discarded.

It will be appreciated that when the term message 24 is employed in this section, the reference is intended to imply any communication sent over an instant-messaging system 10 including, but not limited to, one-on-one messages, group chat invitations, audio, video, and file transfers, among others. Instant messaging may be modeled as a one-way communication of a message 24 also denoted as m, from a sender or originator s, 20, to one or more recipients 30, also denoted herein as R. In addition, in an exemplary embodiment, an arbitrary code 22, also denoted as c is coupled with a message 24 for transmission to a recipient 30. In selected instances, the code 22 may be employed as a predicate for delivery of the message 24. In others, the code 22 may be utilized to manipulate the state or state data for the recipient 30. Further, in yet another exemplary embodiment, a state variable 26 also denoted as v, is employed to track a recipient's 30 state.

In an exemplary embodiment, there are two types of code 22 employed. The first code 22 is configured to read and modify a persistent state stored by a recipient 30. In this instance, when the message 24 and code 22 arrives at a recipient 30, the order of events in the recipient's 30 client software therein does the following:

1) Execute code 22 (for its state-changing side effects)
2) Deliver message 24 to recipient 30.

Another type of code 22 that may be employed in an exemplary embodiment is a predicate code 22. A predicate code 22 is any arbitrary code 22 that executes on a recipient's 30 machine and returns as a function of that operation a boolean value 28 indicating whether or not the message 24 should be delivered to the particular recipient 30. In this instance, when the message 24 and code 22 arrives at the recipient 30 machine, the client software therein does the following:

1) Execute based on predicate code 22.
2) Return value of function 28 also denoted as indicative of a resultant of code 22.
3) Evaluate value of function, if value=true, deliver the message 24 to recipient 30; otherwise, discard message 24.

It will be appreciated that a single message 24 may be sent with both state-changing and predicate codes 22. It will be further appreciated that an implementation is free to provide such a predicate code 22 in any manner that enforces the overall semantics that message 24 should only be delivered to the recipient 30 if the predicate of the code 26 is satisfied. Thus, for example, if message 24 is large (such as a video clip), the predicate code 26 might be sent and evaluated first, such that the message 24 is only sent to affirmative responses to the predicate code 22.

One or more of the features and benefits of the exemplary embodiments may become apparent by way of example. In one example, a network administrator sending virus warnings via an instant-messaging system of a large, worldwide corporation may employ an exemplary embodiment as described herein. The administrator cannot simply send the message once, as those employees who are offline will not receive it. Thus, the administrator might decide to send the message four times throughout the day, in an attempt to canvas the entire employee base. Without the benefit of the described embodiments, many users would receive the same message multiple times. Such redundant messaging is inefficient and results in significant inconvenience. Employing the approach described herein, the message would be sent out along with state-changing and/or predicate code. In one instance, the state-changing code could simply set a value denoted V that indicates that the message was delivered. The predicate code accompanying later messages checks if value V has been set, and discards the message if so. Thus, if a user is offline when the first iteration of the message is sent, the value V will not be set. On the second iteration, suppose the user is online, now, the message is delivered since value V is not yet set, and the state-changing code sets value V. If the user is online during the third or fourth sending of the virus warning, he will not see the message since the predicate code will detect the presence of value V and discard the message.

Other exemplary embodiments may include applications that involve direct, targeted advertising (for example, based on the software installed on a recipient's/user's computer), software advisories (for example, a reminder to install firewall software if the predicate code detects that it is not present on a user's machine), and email reminders (for example, by running predicate code to examine the "last-access date" of a user's email inbox).

In yet another exemplary embodiment, one or more state variable(s) 26 may be employed to track various aspects of the state of a recipient 30. In addition, the state variable 26 may be namespaced based upon the sender 20 (to avoid multiple senders 20 impacting each other's state variables 26 on various recipient's machines). For example, in one exemplary embodiment, a state variable 26 may be characterized by or a function of several parameters. The parameters may include, but not be limited to, state variable (v, r, s) where v is the state variable name, r is the recipient 30 to whom the state variable v 26 applies, and s is the sender 20 that controls the behavior of state variable v 26 and predicates messages 24 to the recipient 30 based upon state variable v 26.

In an exemplary embodiment, the values (v, r, s) may be established and updated in the following way:

a sender 20 can set or update a state variable 26 to a literal value (for example, state variable (v, r, s)=false);

a sender 20 can run selected code or processes to calculate a value for state variable (v, r, s) 26, (for example, a state variable (v, r, s) 26 to find the version of a selected software program installed on recipient's system); and a sender 20 may run selected code at selected intervals of time to calculate and update the value of state variable (v, r, s) 26, (for example, state variable (v, r, s) average memory usage sampled every 4 hours).

It will be appreciated that in one embodiment the state variables 26 are expected to be stored on a recipient's 30 system. In an alternative embodiment, it should be appreciated that a server 12 could store the state variables (v, r, s) 26. In this instance, only the code 22 (predicate or state-variable 26 updating) that queries the state of the recipients 30 system is executed on the recipient's machine and then the results may be reflected back to the server 12.

Such an alternative embodiment provides significant advantages including, but not limited to:

If a predicated message 24 e.g., with predicate code(s) 22 that depends only on existing state variables 26 is sent to many recipients 30, then the message 24 need only be sent once to the server 12: the server 12 could then apply the predicate(s) and send copies of the message 24 only to the recipients 30 that satisfy the predicate code 22. Advantageously, such an approach reduces message traffic and thus saves bandwidth.

Storing state variables 26 on the server 12 facilitates utilization of the state variables 26 without regard to which client 14 computer a particular recipient 30 is utilizing.

State variables 26 maintained at a server 12 may be provided with increased privacy and tamper-prevention facilities.

It will be appreciated that the disclosed embodiments may result in several areas for consideration with regard to security concerns. Of primary concern is the execution of a code on a client 14 machine(s). Thus, to maintain standard security protocols, a security mechanism should be employed to ensure that the execution of code is not destructive or compromises sensitive data. While security techniques are not addressed herein, several existing techniques may be employed to provide adequate security to facilitate utilization of the disclosed embodiments. For example, the client code could be restricted to an easily contained/constrained environment (for example, a scripting language) such that operations allowed to the code can be set and then monitored to prevent unauthorized code from executing. Another security mechanism might be via the use of certificates and digital signatures to ensure the authenticity of the sender.

In order to perform the prescribed functions and desired processing, as well as the computations therefore (e.g., the facilitate instant messaging communications among various servers 12 and clients 14, and the like), the server(s) 12 and/or client(s) may comprise a computer system including central processing unit (CPU), monitor, storage and the like. The computer system may include, but not be limited to, a processor(s), computer(s), memory, storage, register(s), timing, interrupt(s), communication interface(s), and input/output signal interfaces, and the like, as well as combinations comprising at least one of the foregoing. For example, computer system may include signal input/output for controlling of communications switches as described herein. Additional features of a computer system and certain processes therein may be disclosed at various points herein.

The processing performed throughout the instant messaging system 10 may be distributed in a variety of manners. For example, distributing the processing performed in a server 12 or client 14 and among the other processors employed. Such distribution may eliminate the need for any such component or process as described or vice versa, combining distributed processes in a various computer systems. Each of the elements described herein may have additional functionality that will be described in more detail herein as well as include functionality and processing ancillary to the disclosed embodiments. As used herein, signal connections may physically take any form capable of transferring a signal, including, but not limited to, electrical, optical, or radio.

The disclosed invention can be embodied in the form of computer, controller, or processor implemented processes and apparatuses for practicing those processes. The present invention can also be embodied in the form of computer program code containing instructions embodied in tangible media 16 such as floppy diskettes, CD-ROMs, hard drives, or any other computer-readable storage medium, wherein, when the computer program code is loaded into and executed by a computer, controller, or processor 12, 14, the computer, controller, or processor 12, 14 becomes an apparatus for practicing the invention. The present invention may also be embodied in the form of computer program code as a data signal 17 for example, whether stored in a storage medium, loaded into and/or executed by a computer, controller, or processor 12, 14 or transmitted over some transmission medium, such as over electrical wiring or cabling, through fiber optics, or via electromagnetic radiation, wherein, when the computer program code is loaded into and executed by a computer 12, 14, the computer 12, 14 becomes an apparatus for practicing the invention. When implemented on a general-purpose processor the computer program code segments configure the processor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for instant messaging in a network communication system including a sending computing device and a receiving computing device comprising:

formulating at the sending computing device a combined message to a recipient, said combined message including a predictive code and a communications message;

establishing a state variable associated with said recipient, the state variable including one or more parameters, wherein said state variable includes a function configured to select code operating at the recipient computing device and the state variable is updated by the selected code, the state variable being stored at the recipient computing device;

transmitting said predictive code and said communications message to the recipient computing device at the same time;

executing the predictive code at the recipient computing system; and delivering the communications message to the recipient computing system if the predictive code returns a first value and discarding the communications if the predictive code returns a second value.

2. The method of claim 1 further including:
transmitting a modifying code to the recipient that causes a persistent state associated with the recipient to be modified.

3. The method of claim 1 wherein said state variable corresponds to one or more aspects of a state of said recipient.

4. The method of claim 1 further including storing the state variable on a server separate from a recipient.

5. The method of claim 1 wherein said code evaluates a state of said recipient.

6. The method of claim 5 wherein said a state of said recipient includes whether a messages has been previously received.

7. The method of claim 1 further including establishing a security mechanism at a recipient to ensure that code transmitted to, and executed at, a recipient is noninvasive.

* * * * *

UNITED STATES PATENT AND TRADEMARK OFFICE
CERTIFICATE OF CORRECTION

| | | |
|---|---|---|
| PATENT NO. | : 7,660,846 B2 | Page 1 of 1 |
| APPLICATION NO. | : 10/724969 | |
| DATED | : February 9, 2010 | |
| INVENTOR(S) | : Albornoz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1335 days.

Signed and Sealed this

Thirtieth Day of November, 2010

David J. Kappos
*Director of the United States Patent and Trademark Office*